United States Patent [19]

Jennings, Jr.

[11] Patent Number: 5,322,122
[45] Date of Patent: Jun. 21, 1994

[54] SIMULTANEOUS ACID FRACTURING USING ACIDS WITH DIFFERENT DENSITIES

[75] Inventor: Alfred R. Jennings, Jr., Plano, Tex.

[73] Assignee: Mobil Oil Company, Fairfax, Va.

[21] Appl. No.: 151,629

[22] Filed: Nov. 15, 1993

Related U.S. Application Data

[63] Continuation-in-part of Ser. No. 057,132, May 3, 1993.

[51] Int. Cl.$^5$ ............................................. E21B 43/27
[52] U.S. Cl. ..................................... 166/307; 166/308
[58] Field of Search ............... 166/307, 308, 281, 282, 166/271, 269

[56] References Cited

U.S. PATENT DOCUMENTS

| | | | |
|---|---|---|---|
| 3,251,415 | 5/1966 | Bombardieri et al. | 166/307 |
| 3,954,142 | 5/1976 | Broaddus et al. | 166/307 |
| 4,007,789 | 2/1977 | Clampitt | 166/307 X |
| 4,415,805 | 11/1983 | Fertl et al. | 250/260 |
| 4,787,456 | 11/1988 | Jennings, Jr., et al. | 166/281 |
| 4,807,703 | 2/1989 | Jenning, Jr. | 166/307 |
| 4,842,068 | 6/1989 | Vercaemer et al. | 166/269 |
| 4,917,185 | 4/1990 | Jennings, Jr., et al. | 166/307 X |
| 5,018,578 | 5/1991 | El Rabaa et al. | 166/269 X |
| 5,161,613 | 11/1992 | Jones | 166/307 |
| 5,203,413 | 4/1993 | Zerhboub | 166/307 X |

*Primary Examiner*—Stephen J. Novosad
*Attorney, Agent, or Firm*—Alexander J. McKillop; George W. Hager, Jr.; Charles A. Malone

[57] ABSTRACT

Two spaced apart zones of a carbonate containing formation are simultaneously acid fractured. A lower density fracturing acid is injected into an upper zone of the formation via an annulus of a perforated wellbore communicating with the upper zone thereby causing a fracture to propagate. Simultaneously therewith, a higher density fracturing acid is injected into a lower spaced apart zone via a tube within the wellbore which fluidly communicates with the lower zone thereby causing simultaneously the propagation of a second fracture. Neither fracture contacts the other although complete fracture growth and zonal acidizing is obtained.

8 Claims, 1 Drawing Sheet

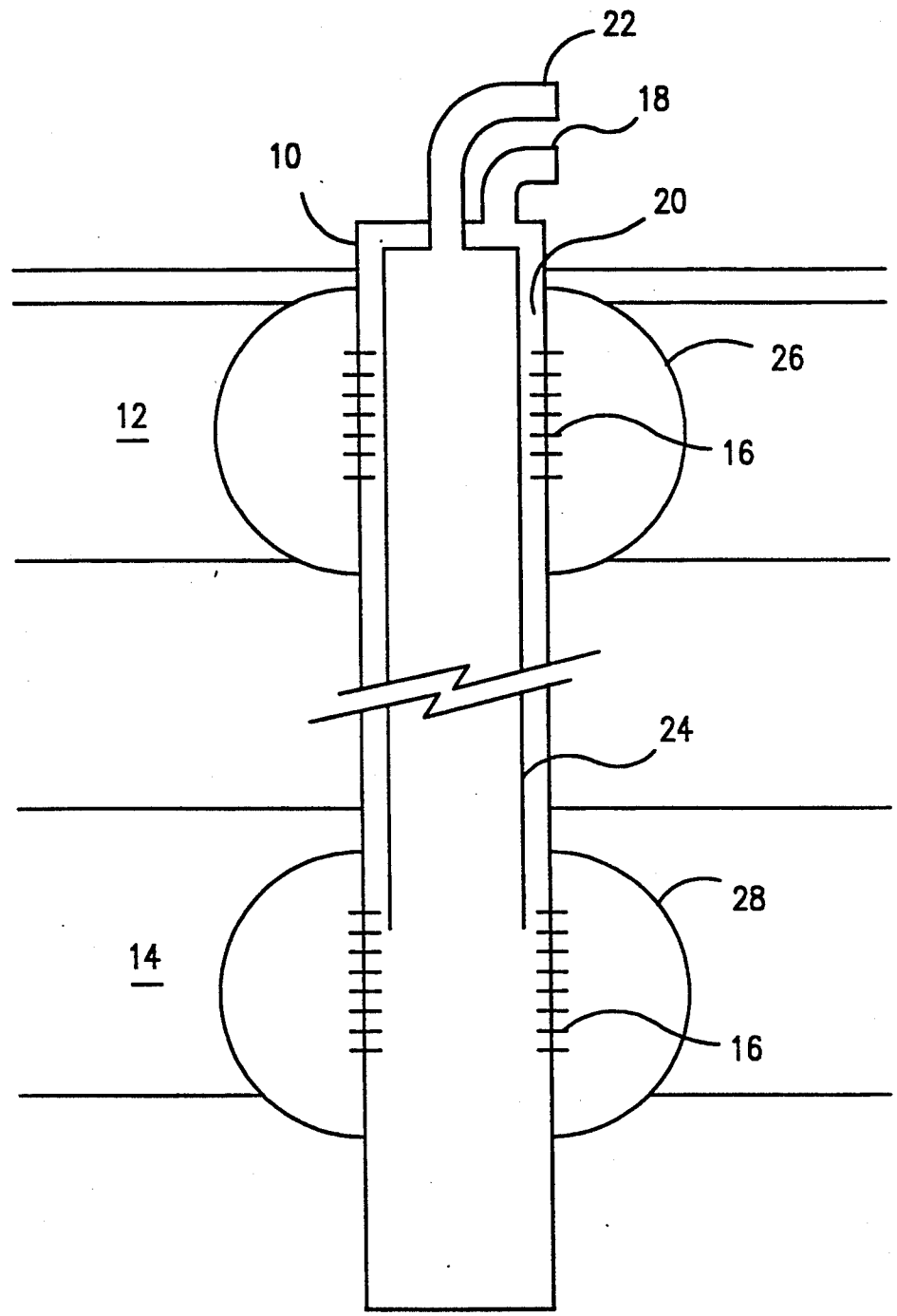

SIMULTANEOUS ACID FRACTURING USING ACIDS WITH DIFFERENT DENSITIES

This invention is a continuation-in-part of Ser. No. 08/057,132 which was filed on May 3, 1993.

FIELD OF INVENTION

This invention relates to methods for fracturing a subterranean formation and, more particularly, to a new method for fracturing a carbonate formation surrounding a wellbore with acids of different densities.

BACKGROUND OF THE INVENTION

In the completion of wells built into the earth, a string of casing is normally run into the well and a cement slurry is flowed into the annulus between the casing string and the wall of the well. The cement casing slurry is allowed to set and form a cement sheath which bounds the string of casing to the wall of the well. Perforations are provided through the casing and a cement sheath adjacent the sub-surface formation. Fluids, such as oil or gas, are produced through these perforations into the well.

It is common practice to acidize subterranean formations in order to increase the permeability thereof. For example, in the petroleum industry it is conventional to inject an acidizing fluid into a well in order to increase the permeability of a surrounding hydrocarbon-bearing formation and thus facilitate the flow of hydrocarbon fluids into the well from the formation or the injection of fluids, such as gas or water, from the well into the formation. Such acidizing techniques may be carried out as "matrix acidizing" procedures or as "acid fracturing" procedures.

In matrix acidizing, the acidizing fluid is passed into the formation from the well at a pressure below the breakdown pressure of the formation. In this case, increase in permeability is effected primarily by the chemical reaction of the acid within the formation with little or no permeability increase being due to mechanical distortions within the formation as in fracturing.

In acid fracturing, the acidizing fluid is disposed within the well opposite the formation to be fractured. Thereafter, sufficient pressure is applied to the acidizing fluid to cause the formation to break down with the resultant production of one or more fractures therein. An increase in permeability thus is effected by the acid etching of the fractures formed as well as by the chemical reaction of the acid within the formation.

In yet another technique involving acidizing, the formation is fractured initially using an inert fluid (inert fluids may be gelled water containing polymers such as hydroxypropyl guar or hydroxyethyl cellulose). Thereafter, an acidizing fluid is injected into the formation at fracturing pressures to extend the created fracture and to "finger through" the fracture filled with the inert fluid. This technique is marketed by Hallibriton Services, Duncan, Okla., as the MY-T-Acid ® process.

In U.S. Pat. No. 4,807,703 to A.R. Jennings, Jr., there is described an acid treatment of a subterranean formation to improve productivity of hydrocarbons from a reservoir therein employing an acid fracturing of the formation surrounding a well penetrating the hydrocarbon reservoir. Such acid treatment involves the injection of a gelled and foamed acid into a formation under conditions and pressures sufficient to fracture the formation and create a foam pad in the face of at least one resultant fracture. Thereafter, an ungelled and foamed acid is injected into the fracture which acid "fingers" through the foam pad thereby unevenly etching the fracture and propagating to substantially further distances into the formation. When the acid is spent and the desired amount of etching and fracturing is obtained, the gelled composition is removed from the formation. Hydrocarbon fluids are then produced from the formation.

Wells completed through formations at multiple intervals always present a challenge for effective treatment. Frequently, various methods of zone isolation or diverting will be used in treating more than one well, especially if the zones of interest are separated by a few hundred feet. Wells which are perforated over several hundred feet in a single zone also create a challenge to treat them effectively with well stimulation such as acidizing or hydraulic fracturing.

Therefore, what it is needed is a method for acid fracturing a carbonate formation having multiple intervals or zones which method does not require zone isolation.

SUMMARY OF THE INVENTION

This invention is directed to a method for simultaneously acid fracturing two spaced apart zones of a carbonate containing formation. A lower density fracturing acid is injected into an upper zone of said formation via an annulus within a perforated wellbore. Perforating the wellbore causes it to communicate fluidly with the upper zone. The lower density fracturing acid is injected at a pressure sufficient to initiate and propagate a first fracture within the upper zone. While injecting the lower density fracturing acid into the upper zone, a higher density fracturing acid is injected by a tubing string within the wellbore into a lower spaced apart zone of the formation. Perforations contained in the wellbore allow fluid communication with the lower zone so as to permit the fracturing acid to enter therein. The higher density fracturing acid enters the lower zone at a pressure and rate sufficient to simultaneously initiate and propagate another fracture within the lower zone. Neither fracture contacts the other fracture. Complete fracture growth is obtained in each zone while each fracture in that zone is confined to its own zone. If the zones should communicate, density differences of the fluids will keep the lower and higher fracturing acids confined to their respective zones or intervals.

It is therefore an object of this invention to ensure complete zonal coverage when acid fracturing a carbonate formation at different spaced apart zones.

It is another object of this invention to minimize the effects of problematic fracture growth which occur with sequential acid fracturing in spaced apart carbonate zones.

It is a further object of this invention to minimize acid fracturing costs by simultaneously making two fractures at two spaced apart carbonate zones while conducting one fracturing operation.

It is another further object of this invention to provide for a simultaneous acid fracturing method for spaced apart carbonate zones which method does not require a mechanical packer.

BRIEF DESCRIPTION OF THE DRAWING

The drawing is a schematic representation of a perforated wellbore in which acid fracturing has been simultaneously conducted at two different spaced apart carbonate intervals or zones of the formation.

DESCRIPTION OF THE PREFERRED EMBODIMENT

Referring now to the drawing, wellbore 10 has penetrated upper carbonate zone 12 and lower carbonate zone 14. Lower carbonate zone 14 is separated from upper carbonate zone 12 by a distance of about 50 to about 300 feet or more. Wellbore 10 communicates fluidly with upper carbonate zone 12 and lower carbonate zone 14 by perforations 16. An annular space or annulus 20 is formed via the outside wall of wellbore 10 and a tubing string 24 centrally located within the wellbore. Tubing string 24 communicates fluidly with the surface via tubing string conduit 22. Tubing string conduit 22 communicates fluidly with a "frac" fluid supply means (not shown) and a pumping means (not shown). Annulus or annular space 20 fluidly communicates to the surface via annulus conduit 18. Annulus conduit 18 is connected to a "frac" fluid supply means (not shown) and a pumping means (not shown).

In order to create two simultaneous fractures at different spaced apart carbonate zones of the formation, an aqueous fracturing acid is directed down annulus conduit 18 so as to enter upper carbonate zone 12 through perforations 16. Hydraulic fracturing pressure is applied while simultaneously directing an aqueous fracturing acid which is heavier than the first fracturing acid into tubing string 24 via tubing string conduit 22. The heavier fracturing acid is directed by tubing string 24 into lower carbonate interval or zone 14 via perforations 16. Aqueous fracturing acid is continually directed into annulus conduit 18 and tubing string conduit 22 so as to simultaneously enter upper carbonate zone 12 and lower carbonate zone 14 respectively. The rate and pressure of the fracturing acid entering upper carbonate zone 12 and lower carbonate zone 14 is at a rate and pressure sufficient to simultaneously create within upper carbonate zone 12 one fracture 26 while simultaneously creating another fracture 28 in lower carbonate zone 14. Tubing string 24 is open-ended where it is located in an area adjacent to perforations 16 in wellbore 10 within lower zone 14.

As fracture 26 which is created in upper carbonate zone 12 propagates through that zone, it completely covers that zone. Additionally, since a lighter density hydraulic fracturing acid is utilized in upper carbonate zone 12, less pressure is generated in that zone so the fracture does not propagate out of zone 12. Less fracturing force is required because less pressure is generated in zone 12 because its depth is less than that in zone 14. Because lower zone 14 is at a greater depth, a higher density fracturing acid is needed to generate greater pressures in zone 14. Thus, fracture 28 does not propagate upwardly into zone 12 and problematic fracture growth is eliminated.

While fracture 28 is simultaneously propagated through lower carbonate zone 14, it too completely covers zone 14. Neither fracture 26 nor fracture 28 touch each other by penetrating through the area separating upper carbonate zone 12 from lower carbonate zone 14. Fracture 26 that forms in upper carbonate zone 12 does not tend to propagate downwardly far enough so as to contact fracture 28 in lower carbonate zone 14. Similarly, fracture 28 in lower carbonate zone 14 does not propagate upwardly so as to contact fracture 26 in upper carbonate zone 12. Since the hydraulic fracturing acid of a lighter density is entering upper formation 12 at the same time that a heavier fracturing acid is entering lower carbonate zone 14, with substantially the same injection rate and pressure without co-mingling of the fracturing fluids, a mechanical packer is therefore not required to separate upper carbonate zone 12 from lower carbonate zone 14. Since both zones are being simultaneously hydraulically fractured, only one fracturing operation need be conducted in both zones. Conducting one hydraulic fracturing operation in both zones at the same time saves both time and money.

The effectiveness of fracturing at each zone of the formation can be determined by available methods. One such method is described in U.S. Pat. No. 4,415,805 that issued to Fertl et al. This patent is incorporated herein by reference. This method describes a multiple stage formation operation conducted with separate radioactive tracer elements injected into the well during the fracturing operation. After completion of the fracturing operation, the well is logged using natural gamma ray logging. The resulting signals are sorted into individual channels or energy bands characteristic of each separate radio tracer element. Results of the simultaneous fracturing operation are evaluated based on disbursement of the individual tracer elements.

Wellbore 10 can be cased or uncased. If the wellbore is cased, the casing is cemented into wellbore 10. Thereafter, the casing is selectively perforated in a manner so that in subsequent treatments, fluids being pumped therein will pass through all perforations at a substantial rate. While the pumping rate of the hydraulic fracturing acid is formation dependent, it should be at least about 1 to about 10 barrels per fracture. Perforations are made within wellbore 10 at a spacing of about 10 to about 100 feet apart so a desired fracture spacing can be obtained. These perforations should comprise two sets of perforations which are simultaneously formed on opposite sides of wellbore 10. Preferably, these perforations should have diameters between about ¼ to about one inch. They should be placed circumferentially about the casing in the anticipated plane where it is desired to induce a fracture into the zone. The number and size of perforations are determined by the fracture treatment pumping rate and the pressure drop necessary to divert sufficient fluid through all the perforations to create simultaneously fractures in the upper and lower zones.

Fracturing acids which can be utilized should have a density differential at least in the order of about 0.5 pounds per gallon to insure that there is no commingling of the lower and higher density acids. For example, if the lower density acid is in the range of about 9.5 to about 10.0 pounds per gallon, then the higher density acid should be at least in the range of about 10.0 to 10.5 pounds per gallon.

In a further aspect of the invention, zonal acid treatment can be designed to tailor the configurations of each of the upper and lower fractures. For example, differing volumes of lower and higher density acids are injected through perforations 16 to selectively control the propagation of the fracture 26 in the upper carbonate zone 12 with respect to the propagation of the fractures 28 in the lower carbonate zone 14.

The fracturing acid utilized may be any of the aqueous solutions of acid commonly employed for acidizing formations. For example, the acid may preferably be an aqueous solution of hydrochloric acid. Although hydrochloric acid is preferred, the following aqueous solutions of organic acids may also be utilized: formic, acetic and oxalic. When hydrochloric acid is utilized, it should be a concentration of about 5 to about 28% by weight of hydrogen chloride. The use of aqueous solutions of hydrochloric acid for acidizing subterranean formations is described in U.S. Pat. Nos. 4,787,456 and 4,917,185 to A. R. Jennings, Jr. These patents are incorporated herein by reference.

In some reservoirs, the upper and lower zones may be formed from different types of carbonate formations such as dolomite and limestone as examples. One difficulty encountered in acid fracturing of such a reservoir is the differing reaction rates of the fracturing acid with the differing dolomite and limestone zones of the reservoir with which the acid comes into contact. To overcome such a difficulty, it might be desirable to use a different acid in each of the formations. For example, in the less reactive dolomite zone a hydrochloric acid would be the preferred fracturing acid, while in the more reactive limestone zone an organic acid would be the preferred fracturing acid.

Although the present invention has been described with preferred embodiments, it is to be understood that modifications and variations may by resorted to without departing from the spirit and scope of this invention, as those skilled in the art will readily understand.

What is claimed is:

1. A method for simultaneously acid fracturing two spaced apart zones of a carbonate containing formation comprising:
    a) injecting a lower density fracturing acid into an upper zone of said formation via an annulus of a perforated wellbore communicating with said upper zone which fluid is injected at a pressure sufficient to initiate and propagate a first fracture within said upper zone; and
    b) simultaneously injecting with the fracturing acid of step a), a higher density fracturing acid into a lower spaced apart zone of said formation via a tubing string within the perforated wellbore that communicates fluidly with said lower zone which acid is injected at a pressure sufficient to simultaneously initiate and propagate another fracture within said lower zone which does not contact the first fracture thereby obtaining complete fracture growth that is confined to each zone while acidizing in each zone.

2. The method as recited in claim 1 where the lower and upper zones are spaced about 50 to about 200 feet apart.

3. The method as recited in claim 1 wherein the density of the higher density fracturing acid is about 0.5 pounds per gallon heavier than the lower density fracturing acid.

4. The method as recited in claim 1 where the tubing string is open-ended above perforations which fluidly communicate the wellbore with said lower zone.

5. The method as recited in claim 1 where the lower and higher density fracturing acids do not co-mingle while fracturing the zones.

6. The method as recited in claim 1 where the lower and higher density fracturing acids are different acids.

7. The method as recited in claim 1 where the lower and higher density fracturing acids are different acids and are selected from a member of the group consisting of hydrochloric, formic, acetic, and oxalic acid.

8. The method as recited in claim 1 where hydrochloric acid is directed into a zone of the formation which is most reactive to an acid while an organic acid selected from a member of the group consisting of formic, acetic, or oxalic acid is directed into a less acid active reactive zone.

* * * * *